United States Patent [19]

French

[11] Patent Number: 4,538,034

[45] Date of Patent: Aug. 27, 1985

[54] EARPHONE ASSEMBLY

[76] Inventor: Alan French, 27 Druid Rd., Warwick, R.I. 02888

[21] Appl. No.: 476,761

[22] Filed: Mar. 18, 1983

[51] Int. Cl.³ .................................... H04M 1/05

[52] U.S. Cl. .................................... 179/182 R; 2/209; 179/156 R

[58] Field of Search ........... 179/182 R, 156 R, 156 A, 179/182 A; 2/209

[56] References Cited

U.S. PATENT DOCUMENTS

| | | | |
|---|---|---|---|
| 1,560,718 | 11/1925 | Nowosielski | 179/156 R |
| 1,648,832 | 11/1927 | Urban | 179/182 R |
| 2,361,963 | 11/1944 | Rosenblatt | 179/182 R |
| 2,653,193 | 9/1953 | Anderson | 179/156 R |
| 2,676,213 | 4/1954 | Anderson | 179/156 R |
| 2,761,914 | 9/1956 | Hall | 179/156 R |
| 3,134,861 | 5/1964 | Dempsey et al. | 179/156 R |
| 3,301,255 | 1/1967 | Glorig | 179/182 R |
| 3,308,480 | 3/1967 | Elder | 179/156 R |
| 3,549,831 | 12/1970 | Ferney | 179/156 R |
| 3,787,899 | 1/1974 | Krawagna | 179/156 R |
| 4,027,113 | 5/1977 | Matsumoto et al. | 179/156 R |
| 4,037,273 | 7/1977 | Labaire | 2/209 |
| 4,048,453 | 9/1977 | Seidel | 179/156 R |
| 4,100,653 | 7/1978 | Sensabaugh | 179/157 |
| 4,110,583 | 8/1978 | Lepper | 179/156 R |
| 4,375,702 | 3/1983 | Lundin | 179/156 R |
| 4,420,657 | 12/1983 | Larkin | 179/182 R |

FOREIGN PATENT DOCUMENTS

| | | | |
|---|---|---|---|
| 287409 | 9/1915 | Fed. Rep. of Germany | 179/156 A |
| 2351504 | 4/1975 | Fed. Rep. of Germany | 179/156 A |
| 1144294 | 3/1969 | United Kingdom | 179/156 A |

*Primary Examiner*—Gene Z. Rubinson
*Assistant Examiner*—Danita R. Byrd
*Attorney, Agent, or Firm*—Salter & Michaelson

[57] ABSTRACT

An earphone assembly including a bracket member for retaining an earphone unit in place on the head of a user, the bracket member being formed with a channel for receiving a strap of a head gear for mounting the bracket member on the user's head, the bracket member having a shape and configuration for urging the earphone unit into positive engagement with the ear of the user for the efficient transmission of sound thereto.

5 Claims, 7 Drawing Figures

EARPHONE ASSEMBLY

BACKGROUND OF THE INVENTION

The present invention relates to an earphone assembly having an unique bracket member for retaining an earphone unit as used with a portable radio or cassette player for leisure activity in place on the head of a user, the bracket member having a shape and configuration for receiving a strap of a head gear in engagement therewith, wherein the bracket member is located in that position on the user's head by which the earphone unit secured to the lowermost end thereof is positively urged into engagement with the ear of the user.

Earphones or ear pieces for use with various kinds of headsets for plugging into radios, cassettes, and various kinds of communication equipment have been in general use heretofore, and usually included a pair of ear pieces that were attached to opposite ends of a bendable plastic or metal band that was worn over the head of the user for location of the ear pieces in engagement with the ears of the user. Sets of this type have been available both as earphone sets and as ear protector sets, both types of ear pieces, however, having the disadvantage of being bulky and cumbersome as well as being relatively uncomfortable to wear for extended periods of time. Further, the prior known earphone sets were not adaptable for use in leisure activities and would become dislodged with even the slighted physical activity.

A head set or headphone construction of the general type in use heretofore and having a bendable metallic over-the-head strap is illustrated in the U.S. Pat. No. 3,031,539 to Schuster et al,. Ear pieces of the type that provide accoustical protection are illustrated in the U.S. Pat. Nos. 4,037,273, to Labaire, and 2,361,963 Rosenblatt. The headphone as disclosed in the Schuster et al patent is of the conventional type and includes a bendable metal strap that fits over the head of the user, and as such was not only uncomfortable in the use thereof but did not always locate the earphone in proper oriented relation to the user's head. The present invention, as will be described hereinafter, avoids the use of a bendable metal strap and incorporates a novel bracket member that is maintained in place by a strap of a conventional head gear in a manner that is both comfortable in use and effective in placing an earphone unit in secure oriented position on the user's head.

Both the Labaire and Rosenblatt patents are concerned with the protection of the ears of the user against sounds of extreme intensity, and therefore do not pertain to an earphone construction wherein the ear piece is placed in aural communication with the ear of the user for transmission of sound thereto. As will be described, the head gear as incorporated in the subject invention is normally provided with a nonmetallic strap that is similar in some respects to the Labaire and Rosenblatt head pieces that provide for the securement of the ear protectors on the head of the user, but in applicant's device, the strap of the head gear as incorporated therein cooperates with a novel bracket member for mounting an earphone unit on the head of the user so as to place the earphone unit in proper oriented position thereon to efficiently transmit sound to the user's ear. Further, the head gear strap cooperates with the bracket member to securely locate the earphone in place on the user's head without fear of dislodgement thereof even if the user is involved in some physical activity such as exercising or jogging.

Other types of head sets and ear piece construction representing the closest prior art of which applicant is aware as relating to the subject invention are illustrated in the U.S. Pat. Nos. 3,134,861 to Dempsey et al; 1,560,718, Nowosielski; 1,648,832 Urban; 3,549,831 Forney; 3,308,480 Elder; 4,167,043 Hartig; 4,100,653 Sensabaugh; and 4,110,583 Lepper.

In the latter listed patents as referred to above, the head set constructions as disclosed therein relate to the ear piece units per se and therefore do not contemplate the novel features of applicants's attachment as embodied in the subject invention, wherein a unique bracket construction is provided for securely mounting an earphone unit on the head of the user in proper oriented relation with respect to the ear of the user.

SUMMARY OF THE INVENTION

The present invention relates to an earphone assembly for use with a head gear for retaining an earphone unit in place on the head of the user, and includes a bracket member on which an earphone unit is removably mounted, the bracket member including an upper portion in which a channel is formed that receives the head gear therein to confine the bracket member between the head gear and the head of the user, wherein the bracket member is retained in place on the user'head. The earphone unit is mounted on the bracket member relative to the upper portion thereof, such that it is positively urged into engagement with the ear of the user when the bracket member is secured on the user's head by the head gear, this location of the earphone unit by the bracket member further insuring proper oriented relation of the earphone unit for the efficient transfer of sound to the ear of the user.

It is therefore the primary object of the present invention to provide an earphone assembly for use with a head gear for retaining an earphone unit in place on the head of the user that permits simple and easy engagement thereof with the head gear for enabling the earphone unit to be comfortably worn or used for extendeds period of time.

Another object of the instant invention is to provide a simple bracket member for securing an earphone unit in place on the head of a user, wherein sound signals are transmitted to the user's ears without requiring the use of cumbersome over-the-head type of head bands or the like, and enabling the user to engage in a leisure activity without the dislodgement of the earphone assembly from the position of use.

Other objects, features and advantages of the invention shall become apparent as the description thereof proceeds when considered in connection with the accompanying illustrative drawings.

DESCRIPTION OF THE DRAWING

In the drawing which illustrates the best mode presently contemplated for carrying out the present invention.

DESCRIPTION OF THE INVENTION

Figure 1:
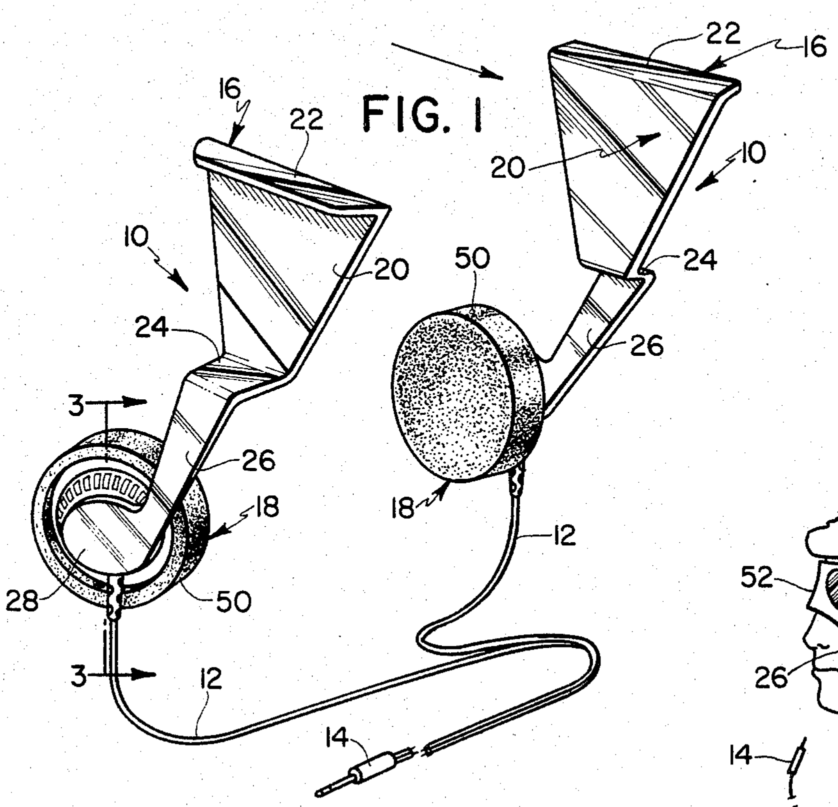
FIG. 1 is a perspective view of an earphone assembly embodied in the subject invention and shows the bracket members that are mountable on the head of the user and the earphone units that are attachable to the bracket members at the lower end thereof, the brackets and earphone units being located in the oriented position of use and being shown connected to a conventional plug jack.

Referring now to the drawing and particularly to FIG. 1, a pair of earphone assemblies as embodied in the present invention are illustrated, each earphone assembly being generally indicated at 10. The earphone assemblies 10 together comprise the complete earphone headset which includes a microphone cable 12 electrically connected thereto and a jack 14 that is fixed to the cables 12 and that is receivable in a suitable socket of an audio source. In this connection, the jack 14 is connectable to various kinds of portable audio equipment including stereo cassete players and radios that are presently in common use.

The current headset equipment now in use with portable audio devices usually includes an over-the-head band to which earphone parts are attached. Since it has become a common practice to physically carry the audio device on the body of the user and to even engage in leisure activity such as exercising, jogging, etc., retaining the earphone units in proper oriented position on the user's head has become a difficult problem and oftentimes the earphone assemblies become dislodged in the prior known devices with only a minimal of physical activity. In order to avoid the problems of the prior art devices in retaining the earphone assemblies in place each of the earphone assemblies 10, include a bracket member generally indicated at 16. As will hereinafter be more fully described, an earphone unit generally at 18 is removably connected to the lowermost end of each of the bracket members 16.

Figure 5:
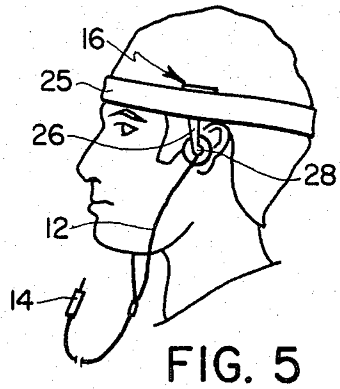
FIGS. 5, 6 and 7 illustrate the use of the earphone assembly of the subject invention as applied to various types of leisure head gear.
Figure 2:
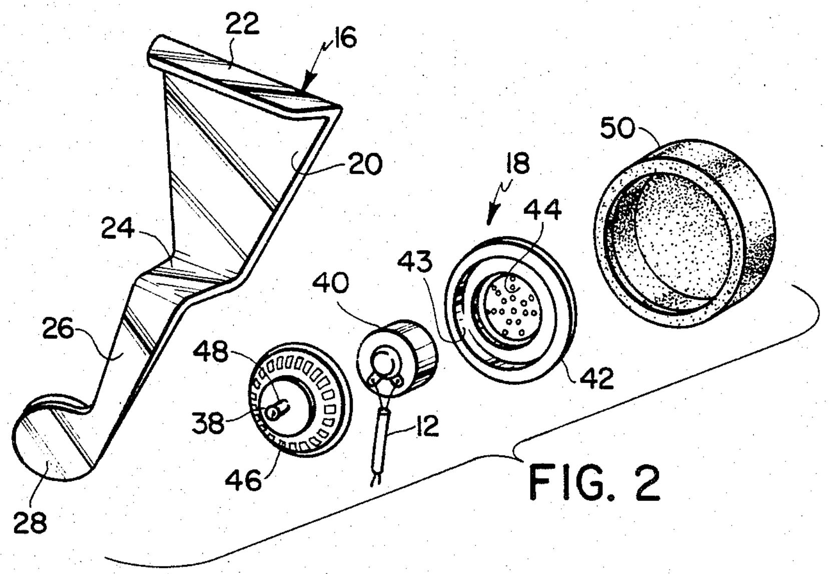
FIG. 2 is an exploded perspective view of one of the bracket members and earphone units that is attachable thereto.
Figure 3:
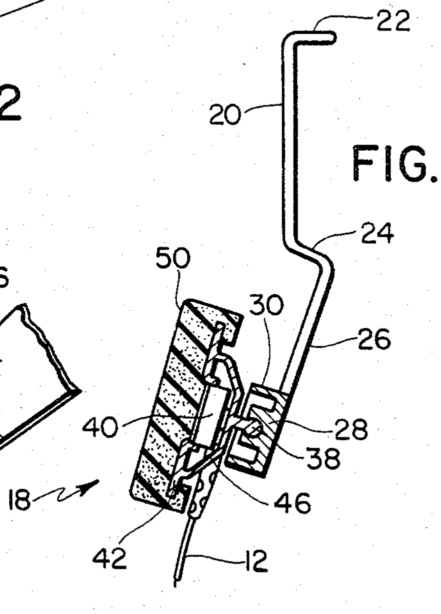
FIG. 3 is a sectional view taken along line 3—3 in FIG. 1.

As illustrated in FIGS. 1–3, each bracket member 16 includes a main body portion 20 to which an upper flange 22 is joined at right angles thereto. The body portion 22 has a generally trapazoidal configuration and tapers from the upper end to the lower end thereof terminating in an intermediate portion 24 that is inclined relative to the body portion 20. The upper flange 22 and the intermediate portion 24 although not being illustrated in parallel relation, define with the body portion 20, a channel that receives a strap or the like of a head gear, one example of which is illustrated in FIG. 5 as a head band 25. The mounting of the bracket member 20 on the head band 25 will be more fully described hereinafter.

Figure 4:
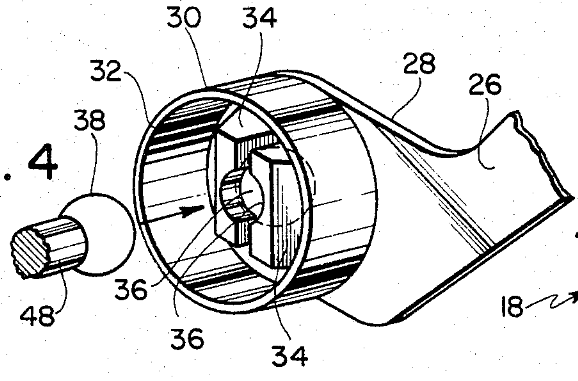
FIG. 4 is an enlarged fragmentary perspective view of the lowermost end of one of the bracket members and showing a fastening device as joined thereto that receives a ball element of the earphone unit therein for securement of the earphone unit to the bracket member.

Joined to the intermediate portion 24 of the bracket member 16 and projecting downwardly relative thereto and at an angle with respect to the plane of the body portion 20, is a lower leg portion 26. The leg portion 26 has a generally downwardly tapering configuration and terminates at the lowermost end thereof in a rearwardly extending foot portion 28. As shown more clearly in FIGS. 3 and 4, a fastening member generally indicated at 30 is secured to the foot portion 28 and includes a ring 32 in which spaced socket elements 34 are located. Each of the socket elements 34 has a semi-circular recess 36 formed therein, and since the socket elements 34 are spaced from each other they are flexible for being urged in a lateral direction for receiving a ball member indicated at 38 that is attached to an element of the earphone unit 18. As will be described, the earphone unit 18 is detachably secured to the bracket member 16 by inserting the ball member 38 into the socket 36 that is defined by the socket elements 34 of the fastening means 30.

The earphone unit 18 is conventional in construction insofar as the operating elements thereof are concerned, and do not form a part of the present invention with respect to the sound communication features thereof. As shown in FIG. 2, each earphone unit 18 includes an earphone element 40 of conventional design and that is provided with the usual contacts for receiving the leads of the microphone cable 12. An inner housing 42 includes a recess 43 having a diameter that is dimensioned for receiving the earphone element 40 therein. Joined to the side of the housing 42 that is locatable adjacent to the user's ear is a grill 44 that provides for the transmission of sound from the earphone element thereto. An outer circular disc 46 encloses the microphone element 40 within the housing 42 and has an end piece 48 joined thereto to which a reduced shank portion 48 is joined. As more clearly illustrated in FIG. 4, the ball member 38 is fixed to the outermost end of the shank portion 48. The disc 46, microphone unit 40 and housing 42 are snapped together as a unit and are enclosed in a rubberized cap 50 that may be formed of any suitable material such as a polyurethane foam or the like to provide for a cushioning effect when the microphone unit 18 is placed in engagement with the user's ear. Each of the microphone units 18 is snapped into place on the bracket member 16 by simply inserting the ball member 38 into the socket as formed in the fastening means 30 of each bracket member 16.

With the earphone assemblies 10 located in the assembled position as illustrated in FIG. 1, they are conveniently mounted in place on the head of the user by placing a head piece or head gear such as head band 25 shown in FIG. 5 on the user's head and then locating each of the bracket members 16 such that the channel as formed by the body portion 20 flanges 22, and intermediate portion 24 receives the head band 26 therein. In this position, the bracket member 16 is then adjusted to the proper oriented location such that the leg portion 26 thereof is disposed just in front of the user's ear. Because of the rearward inclination of the leg portion 26 and the rearward projection of the foot portion 28 with respect thereto, the earphone unit 28 is properly positioned in engagement with the user's ear without the interference of the bracket member 16 therewith. As further illustrated in FIG. 3, the plane of the lower leg portion 26 of the bracket member 16 is located in offset relation with respect to the plane of the upper body portion 20, this offset configuration of the leg portion 26 locating the earphone unit 18 in an inclined position relative to the body portion 20 so that it is positively urged into engagement with the ear of the user when the earphone assembly is mounted in place on the user's head by the head band 26. With the earphone assemblies located in the position shown in FIG. 1, it is understood that the arrow indicated therein points in the direction that the user is facing.

Figure 6:
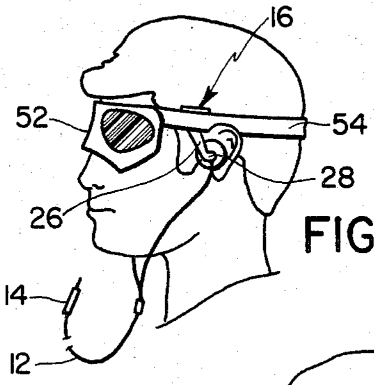
Figure 7:
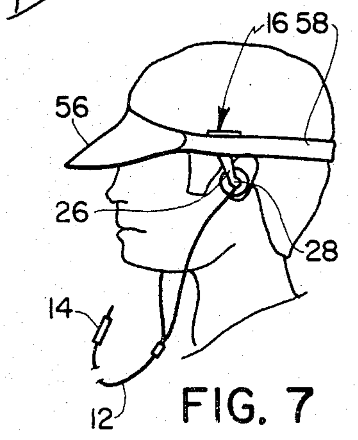

While it is understood that the earphones 18 may be used individually instead of in pairs as part of a headset, it is contemplated that the earphones will be utilized in the conventional manner since a stereo effect is desirable when used in connection with portable radios, cassette players and the like. Further, it is contemplated that the bracket members 16 can be attached to any conventional head gear or covering such as illustrated in FIGS. 5, 6 and 7. In this connection, the description "head gear" is intended to apply to any form of head band strap or covering that would secure the bracket member 16 in place. As shown in FIG. 6, the earphone assemblies are mounted in place on a goggle unit 52 of a user by a strap 54. In FIG. 7, a visor 56 that includes a strap 58 is shown in the position of use as worn by the user and conveniently receives the bracket members 16 of the earphone assemblies thereon. As further shown in FIGS. 5, 6 and 7, the location of the bracket member 16 of each of the earphone assemblies 10 is properly oriented on the straps of the various illustrated head gear as worn by the user, such that the cushioned caps 50 are located in close proximity to the user's ears to provide for the effective transmission of sound thereto.

It is seen that use of the earphone assemblies 10 as embodied in the subject invention eliminate the necessity for traditional headsets which incorporate the over-the-head type of band that have been found to be uncomfortable in use and subject to easy dislodgement. It is also seen that by avoiding the use of the conventional head set, the bracket member 16 and the earphone unit 18 attached thereto may be easily folded into a compact unit and conveniently stored in the user's pocket or a pouch for ready access thereto.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An earphone assembly for use in combination with a relatively narrow flexible head gear for retaining an earphone unit adjacent an ear on the head of a user comprising a bracket member and an earphone unit mounted on said bracket member, said bracket member comprising a main body portion, an upper flange which extends outwardly from said main body portion, and an intermediate portion which extends outwardly from said main body portion in downwardly spaced relation to said flange when said earphone assembly is received on the head of said user, said flange, said body portion and said intermediate portion cooperating to define a channel which is dimensioned to receive said head gear in engagement therein for retaining said bracket member between the head gear and the head of said user, said channel being open and substantially unobstructed to facilitate the removal of said bracket member from and the installation thereof on said head gear while said head gear is on the head of a user, said bracket further comprising a leg portion which extends downwardly from said intermediate portion in outwardly offset relation to said ear when said earphone assembly is mounted on the head of said user, said earphone unit being mounted on said leg portion so that it is urged into engagement with said ear of said user as a result of the engagement of said bracket member by said head gear when said earphone assembly is secured on the head of said user with said head gear.

2. An earphone assembly as claimed in claim 1, said earphone unit being swivelly mounted on said leg portion wherein the offset relation of said leg portion relative to said upper body portion provides for engagement of said earphone unit with the ear of the user when said earphone unit is mounted in place on the user's head by said head gear.

3. An earphone assembly as claimed in claim 2, said leg portion having a rearwardly extending foot portion joined to the lowermost end thereof, means mounted on said foot portion for receiving said earphone unit in swivel engagement, said leg portion being inclined rearwardly relative to said upper body portion of said bracket member and cooperating with the rearwardly extending foot portion to position the earphone unit in place over the user's ear without interference of said bracket member with the ear of the user.

4. An earphone assembly as claimed in claim 3, said receiving means comprising a socket element, said earphone unit having a spherical member joined thereto that is removably received in said socket element for mounting said earphone unit in swivel engagement on said foot portion.

5. An earphone assembly as claimed in claim 4, a circular housing joined to said foot portion and enclosing said socket element therein, said housing being open at the front thereof to allow for insertion of said spherical member into said socket element as located therein.

* * * * *